United States Patent

Wrasse

[11] Patent Number: 5,176,124
[45] Date of Patent: Jan. 5, 1993

[54] SMOKE FREE BARBECUE COOKER

[76] Inventor: Carl O. Wrasse, Box 449, Pinetop, Ariz. 85935

[21] Appl. No.: 806,142

[22] Filed: Dec. 12, 1991

[51] Int. Cl.⁵ .............................................. F24B 3/00
[52] U.S. Cl. .................................. 126/25 R; 126/9 R; 126/29; 99/473
[58] Field of Search ............ 126/25 R, 25 B, 29, 126/9 R, 9 B, 41 R, 41 B, 41 A; 99/435, 467, 473, 476, 481, 482, 340, 397, 482

[56] References Cited

U.S. PATENT DOCUMENTS

| 1,821,620 | 9/1931 | Delacour | 110/235 |
|---|---|---|---|
| 2,527,934 | 10/1950 | Jefferies, Sr. | 110/235 X |
| 3,327,698 | 6/1967 | Leslie | 126/25 R |
| 3,354,848 | 11/1967 | Tolston | 126/25 R X |
| 3,593,647 | 7/1971 | Copeland, Jr. | 99/482 X |
| 4,344,358 | 8/1982 | Maurer | 99/482 X |
| 4,957,039 | 9/1990 | Reyea | 126/25 R X |

Primary Examiner—Larry Jones
Attorney, Agent, or Firm—James F. Duffy

[57] ABSTRACT

A smokeless, non-polluting barbecue cooker has a base canister with a centrally located firebox which communicates with a flue to conduct heat, produced from burning fuel within the firebox, upwards to an oven enclosure supported by the base canister. The heat enters the oven enclosure along its central axis. A grill for the support of food stuffs, to be cooked within the oven, prevents the placement of food stuffs directly over the firebox. Thus no drippings from the food can fall onto the hot fuel within the firebox to produce carcinogenic byproducts. A forced air blower provides sufficient oxygen to the firebox so that essentially complete combustion is achieved; and, the barbecue cooker is smokeless in its operation. Various methods for controlling the heat accumulated within the oven enclosure are disclosed.

16 Claims, 2 Drawing Sheets

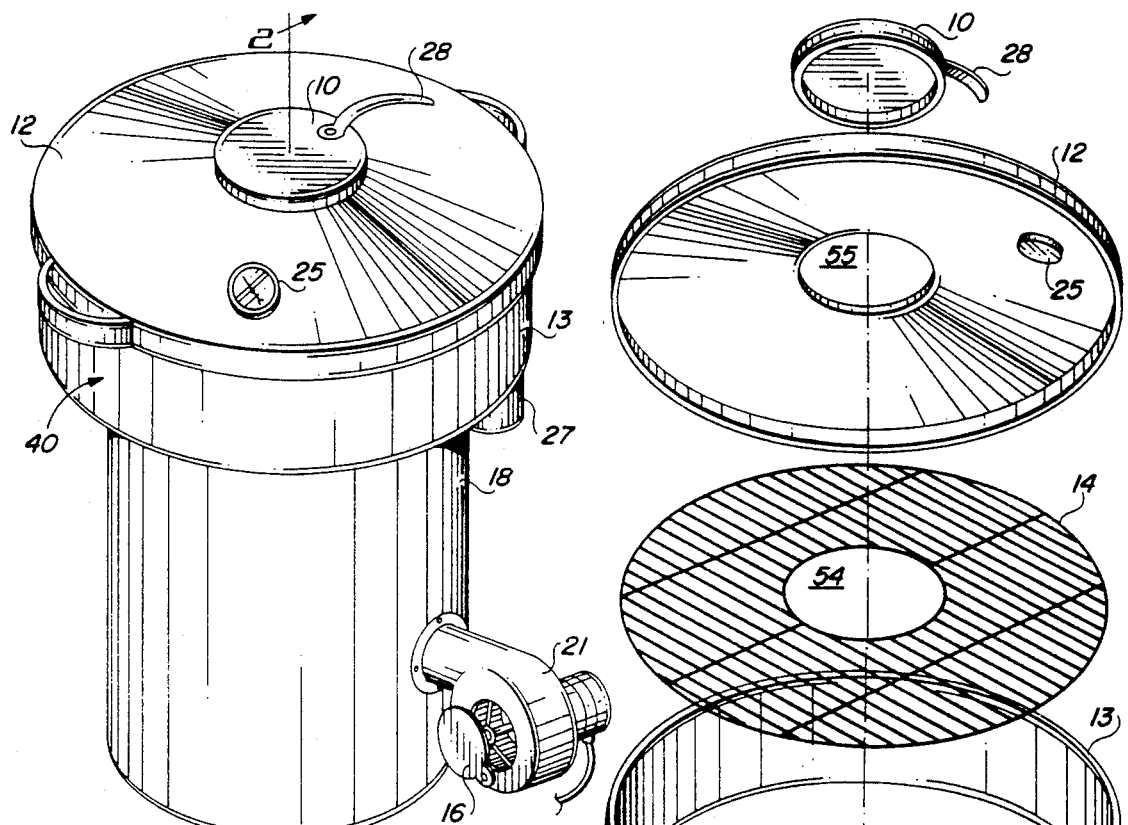
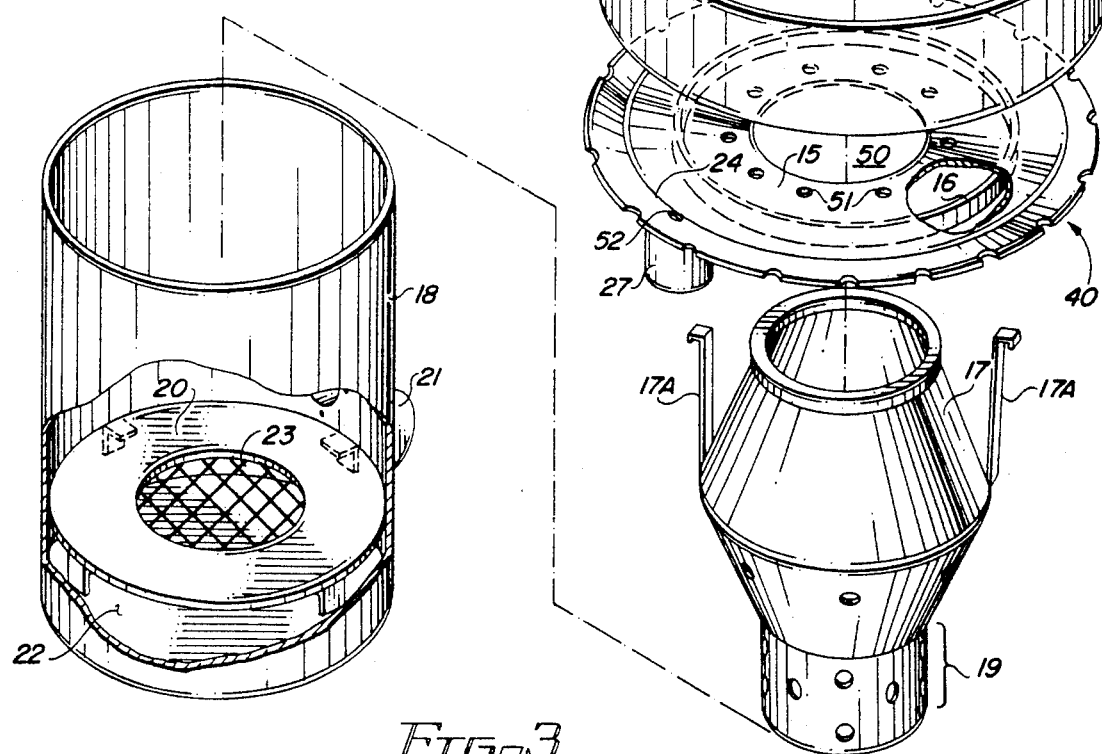
FIG-1
FIG-3

SMOKE FREE BARBECUE COOKER

BACKGROUND

1. Technical Field of the Invention

The invention relates to the oven grilling of meats and other foodstuff. In particular the invention provides a cooker using wood or charcoal as a fuel. Specifically the invention prevents the dripping of juices and fat from the cooking foodstuff onto the hot fuel so as to prevent the production of carcinogenic byproducts.

2. Prior Background Art

Outdoor cooking on family barbecues is accepted as being part of the American scene. The smell of the cooking food produced by the heat of the grill and by the combustion of fats and drippings onto to the hot coals produces a convivial atmosphere amongst those present. Mouths water in anticipation of the grilled food soon to be served.

Unfortunately when fat and juices from cooking meats and other food stuffs drops onto hot coals, carcinogenic byproducts are produced. Often the fire flares up due to the burning of the fat and the flames lick at the bottom of the foods that are being cooked on the grill. This exposure to the flames produces a charring of the meats and other food stuffs. This charring itself is known to produce carcinoqenic byproducts.

It is an intention of the present invention that a barbecue be produced which inhibits the burning of juices and fats on the fuel of the fire. Further, no flame from the fire will reach the food stuffs being grilled. In addition to preventing the generation of carcinogenic byproducts, it is an intent that the present invention shall be essentially smokeless in its operation.

SUMMARY DESCRIPTION OF THE INVENTION

The invention is an improved barbecue grill. It has a firebox in which fuel is combusted to generate heat for cooking. A flue stack is coupled to the firebox to transfer heat from the firebox. There is an enclosure having a removable cover and a floor. The floor has a heat entry coupled to the flue stack for conducting heat from the flue stack into the enclosure.

A grill is placed within the enclosure upon which foods may be placed and supported for cooking above the floor, the grill being free of a support surface for food above the heat entry, whereby drippings from food cooking on the grill will fall free of the heat entry and no drippings will be burned by fuel burning in the fire box.

Included are adjustable draft air means coupled to the firebox for controlling the amount of air available at the firebox for supporting combustion of fuel burned within the firebox. In a presently preferred embodiment, the adjustable draft air means comprises and opening in the removable cover. The opening has a lid adjustable to control the volume of air passing from the firebox through the opening in the cover. Further, the opening in the cover is aligned with the heat entry and the flue stack so that fuel deposited in the opening will pass into the firebox, even though the removable cover is covering the enclosure.

In another preferred embodiment, forced air means are coupled to the firebox for force feeding air into fuel being combusted in the firebox. In this embodiment, the adjustable draft air means comprises damper means on the forced air means for controlling the air flow through the forced air means.

Disclosed is a structure wherein the floor of the enclosure has a central opening serving as the heat entry, the central opening accepting heat output by the flue stack, the heat thereafter accumulating within the enclosure.

Finally, the disclosure and claims include a base canister having an upper end supporting the floor of the enclosure, an ash grid supporting the firebox and accepting the passage of ash from the firebox therethrough, and an ash pit below the ash grid for the accumulation of ashes from the firebox. The canister further comprises means for supporting the firebox and the flue stack in stabile position within the canister.

BRIEF DESCRIPTION OF THE DRAWINGS

FIG. 1 is a perspective of the view of the smoke free barbecue cooker disclosed herein.

FIG. 3 is a cross sectional, side elevational view of the invention.

DETAILS OF BEST MODE FOR CARRYING OUT THE INVENTION

Figure 2:
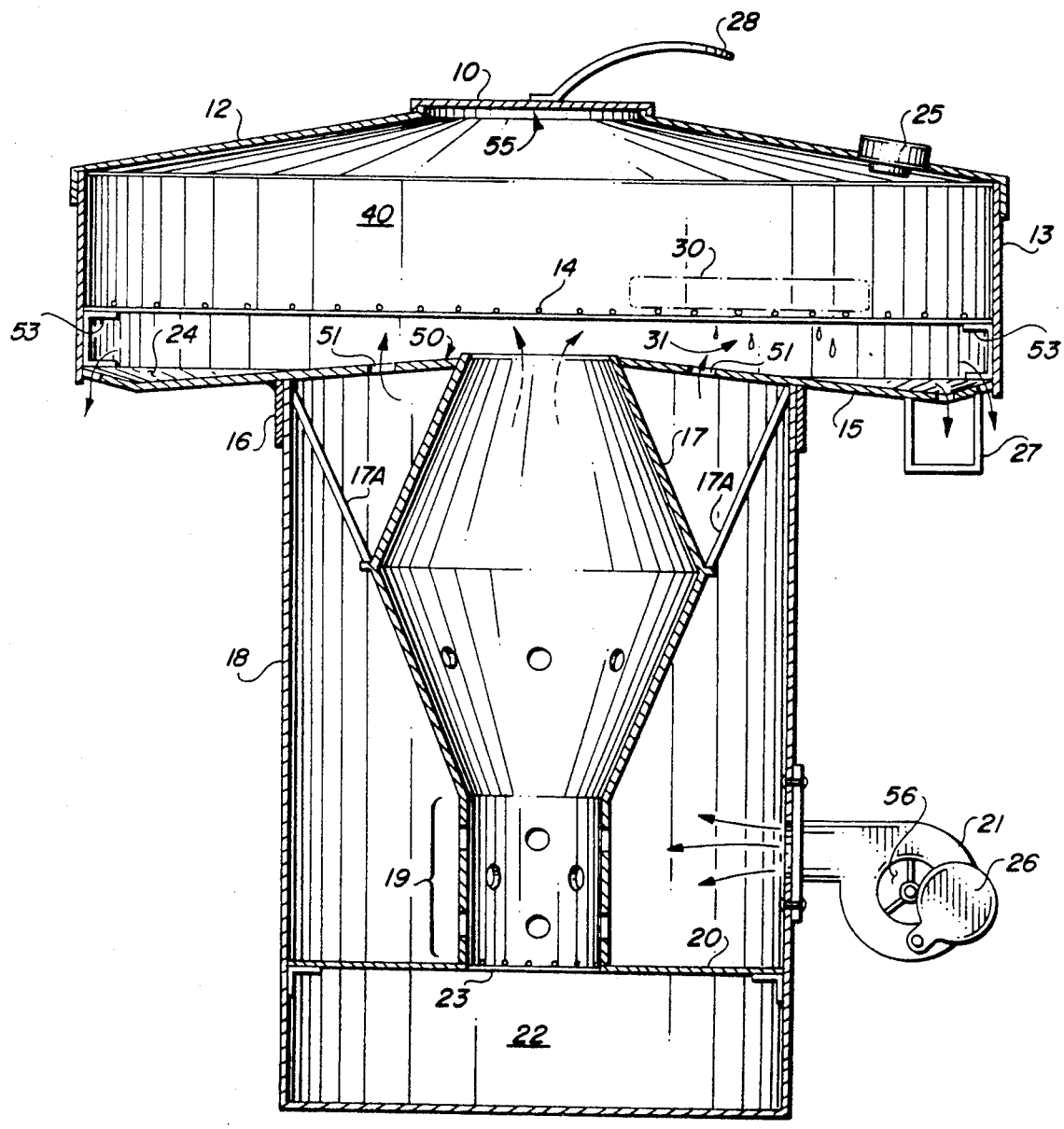
FIG. 2 is an exploded assembly view of the cooker with a part thereof shown in section so as to illustrate the interior.

For purposes of promoting an understanding of the principles of the invention, reference will now be made to the embodiments illustrated in the drawings and specific language will be used to describe same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

The improved barbecue is designed to cook meats in a manner such that fats and juices will not fall directly upon the coals. In prior art barbecues the dripping of fats and juices onto the coals has been found to produce carcinogenic byproducts. Such cancer producing products are also the result of charring of meat over hot coals. In prior art barbecues, as well, a significant amount of smoke is produced when drippings from the cooking meat fall upon the coals. The present invention will eliminate these faults found in prior barbecues and will cook meat in a healthier manner.

The innovative barbecue disclosed herein is illustrated in FIG. 1. In general, the barbecue consists of a base canister 18, oven enclosure 13, oven cover 12 and a small central cover 10 with a handle 28. Central cover 10 may be removed to add fuel to the firebox which is internal of canister 18. Also, central cover 10 may be adjusted to control the draft of air flowing through the barbecue. A constant air draft is produced by blower 21 attached to the side of base canister 18. Blower 21 also has an air flow control damper 16.

The components of the barbecue are better seen in the exploded assembly of FIG. 2. Canister 18 houses a base plate 20. A grated opening at the center of base plate 20 serves as an ash grid 23. Ashes from a fire built above ash grid 23 will pass through grid 23 into ash pit 22 at the base of canister 18. As earlier noted, with respect to FIG. 1, an electric blower 21 provides a draft of forced air into canister 18.

The reader may profitably refer to FIG. 3, which is a sectional, side elevation of the fully assembled barbecue, as the description of the exploded assembly of FIG. 2 continues.

A firebox 19, with flue 17 attached thereto, is inserted into basic canister 18 to rest atop ash grid 23. Fuel, in the form of wood or charcoal, is inserted through the upper part of flue 17 to fall into firebox 19. Several sheets of paper may be first crumpled and ignited and dropped into firebox 19 before the insertion of the fuel. Air flow through the openings in firebox 19 and flue 17 rapidly causes the burning paper to ignite the fuel and provide a fire for the cooking of meats and other food stuff.

When firebox 19 and flue 17 are inserted into base canister 18, hangers 17a, coupled to flue 17, contact the top ring of canister 18 and stabilize flue 17 and firebox 19 in position centrally located within canister 18.

As will be shown, drippings from meats, and the like, cooking within oven 40 will drip down onto oven floor 15 and travel to trough 24 from which the accumulated drippings will flow through opening 52 into collection vessel 27. Since these drippings will never fall upon the hot coals or fuel within firebox 19, the carcinogenic products produced in prior art barbecues are avoided. No such carcinogenic products are so produced within the instant barbecue.

Next, oven enclosure 13 is placed on top of oven floor 15. U-shaped brackets 53 support oven enclosure 13 on top of oven floor 15. There is sufficient space between the peripheral edge of oven floor 15 and the inner wall of oven enclosure 13 so that air flow upwards from the firebox 19 through flue 17 into oven 40 and out through the peripheral spaces is permitted. Because the heat exits at the lowermost portion of oven 40, a generally uniform temperature density is produced within oven 40.

In pursuing the assembly of the barbecue, a grill 14 is inserted within oven enclosure 13 where it is supported by the upper leg of u-shaped brackets 53. Note that grill 40 has a central opening 54 which lies generally in line and coaxial with the opening 50 in oven floor 15 and the opening in flue 17. Thus, additional fuel may be dropped down through opening 54 to reach firebox 19 without the necessity of removing grill 14. The central opening 54 serves an additional purpose. No food stuffs may be cooked directly over the burning fuel in firebox 19. By prohibiting the placement of food stuffs above the hot fuel in firebox 19, no drippings will fall on the hot fuel; and, no carcinogenic products will be produced.

The enclosure which comprises oven 40 is completed with the placement of oven cover, or lid 12 on top of oven enclosure 13. With lid 12 in position, as shown in FIG. 3, the heat rising up through flue 17 will accumulate within oven 40. A thermometer 25 mounted on the surface of lid 12 gives an indication of the temperature within oven 40.

With reference to FIG. 3, meat cooking on grill 14, for example, steak 30, shown in phantom outline, will produce drippings 31. These drippings will land on top of oven floor 15 and flow into trough 24 to eventually find their way, through opening 52, into collection vessel 27.

Lid 12 is provided with a removable cover 10 which covers an opening 55. Opening 55 in lid 12 is in line and coaxial with opening 54 in grill 14, opening 50 in oven floor 15, and flue 17 and firebox 19. Thus, fuel may be inserted into firebox 19 upon removal of cover 10. Cover 10 is provided with a handle 28 to facilitate the manipulation of cover 10.

The temperature within oven 40 may be controlled by controlling the rate of air flow therethrough. As earlier noted, the nominal path for air to exit from oven 40 is through the space about the peripheral edge of oven floor 15, adjacent the inner wall of oven enclosure 13. Because hot air normally rises, the enclosure of oven 14 will receive the full benefit of the heat produced by the burning fuel in firebox 19 before any is exhausted about the peripheral edge of oven floor 15. Should cover 10 be displaced from its nominal closure position, hot air will exit through the opening remaining. The exit of this hot air will tend to reduce the temperature within oven 40. By controlling the degree of displacement of cover 10, and therefore the amount of opening for the escape of heat, a reasonably reproducible method of controlling the heat, in conjunction with observation of thermometer 25, results.

An additional method for controlling temperature within oven 40 is provided by a damper plate 16 at the side of blower 21. Blower 21 draws in air at environmental temperatures through opening 56 at the side of blower 21. Damper plate 16 is rotatable to control the size of the air passageway into opening 56. Damper 16 may be moved to essentially inhibit the passage of air into blower 21 or to permit the maximum amount of air available to pass through the fully exposed opening 56.

As earlier noted, when the barbecue has been assembled in the manner just discussed cover 10 may be removed and wadded pieces of paper dropped down through opening 55 into firebox 19. These wadded rolls of paper may be ignited prior to insertion and fuel placed on top of the burning paper. The fuel will be rapidly ignited in this manner due to the positive air flow created by operation of blower 21.

When thermometer 25 within oven lid 12 indicates that the oven is at a sufficient temperature for the cooking of various food stuffs, food may be emplaced atop grill 14 for cooking. Because the fuel is provided with sufficient oxygen to assure complete combustion, little or no smoke is produced by the burning fuel. The ash which is produced by the burning fuel is fine and filters down through ash grid 23 to accumulate within ash pit 22 at the base of canister 18. In the course of cooking foods, fuel may be replenished by the removal of cover 10 and the insertion of fuel through opening 55 in lid 12.

What has been disclosed is a smokeless, non-polluting barbecue cooker. A base canister has a centrally located firebox which communicates with a flue to conduct heat produced from burning fuel within the firebox upwards to an oven enclosure supported by the base canister. The heat enters the oven enclosure along its central axis. A grill for the support of food stuffs to be cooked within the oven prevents the placement of food stuffs directly over the firebox. Thus no drippings from the food can fall onto the hot fuel within the firebox so as to produce carcinogenic byproducts. A forced air blower provides sufficient oxygen to the firebox so that essentially complete combustion is achieved and the barbecue cooker is smokeless in its operation. Various methods for controlling the heat accumulated within the oven enclosure are disclosed.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such clear and concise manner that those skilled in the art may readily understand and practice the invention, that which is claimed is:

1. An improved barbecue grill comprising:
   a firebox in which fuel is combusted to generate heat for cooking;
   a flue stack coupled to said firebox for transferring heat from said firebox;
   an enclosure having a removable cover and a floor, said floor having a heat entry coupled to said flue stack for conducting heat from said flue stack into said enclosure;
   a grill placed within said enclosure upon which foods may be placed and supported for cooking above said floor, said grill being free of a support surface for food above said heat entry, whereby drippings from food cooking on said grill will fall free of said heat entry and no drippings will be burned by fuel burning in said fire box.

2. The grill of claim 1 wherein said floor of said enclosure has a central opening as said heat entry, said central opening accepting heat output by said flue stack, said heat thereafter accumulating within said enclosure.

3. The grill of claim 2 further comprising a base canister having an upper end supporting said floor of said enclosure, an ash grid supporting said firebox and accepting the passage of ash from said firebox therethrough, and an ash pit below said ash grid for the accumulation of ashes from said fire box.

4. The grill of claim 3 said canister further comprising means for supporting said firebox and said flue stack in stabile position within said canister.

5. The grill of claim 1 adjustable draft air means coupled to said firebox for controlling the amount of air available at said firebox for supporting combustion of fuel burned within said firebox.

6. The grill of claim 5 wherein said adjustable draft air means comprises an opening in said removable cover, said opening having a lid adjustable to control the volume of air passing from said firebox through said opening in said cover.

7. The grill of claim 6, said opening in said cover being aligned with said heat entry and said flue stack so that fuel deposited in said opening will pass into said firebox, while said removable cover is covering said enclosure.

8. The grill of claim 6 including an opening in said cover aligned with said heat entry and said flue stack so that fuel deposited in said opening will pass into said firebox, while said removable cover is covering said enclosure.

9. The grill of claim 5 wherein said floor of said enclosure has a central opening as said heat entry, said central opening accepting heat output by said flue stack, said heat thereafter accumulating within said enclosure.

10. The grill of claim 9 further comprising a base canister having an upper end supporting said floor of said enclosure, an ash grid supporting said firebox and accepting the passage of ash from said firebox therethrough, and an ash pit below said ash grid for the accumulation of ashes from said fire box.

11. The grill of claim 10 said canister further comprising means for supporting said firebox and said flue stack in stabile position within said canister.

12. The grill of claim 5 further comprising forced air means coupled to said firebox for force feeding air into fuel being combusted in said firebox.

13. The grill of claim 12 wherein said adjustable draft air means comprises damper means on said forced air means for controlling the air flow through said forced air means.

14. The grill of claim 12 wherein said floor of said enclosure has a central opening as said heat entry, said central opening accepting heat output by said flue stack, said heat thereafter accumulating within said enclosure.

15. The grill of claim 14 further comprising a base canister having an upper end supporting said floor of said enclosure, an ash grid supporting said firebox and accepting the passage of ash from said firebox therethrough, and an ash pit below said ash grid for the accumulation of ashes from said fire box.

16. The grill of claim 15 said canister further comprising means for supporting said firebox and said flue stack in stabile position within said canister.

* * * * *